July 7, 1931. J. G. DAVIS 1,812,935
MOTOR VEHICLE HEAD LAMP
Filed April 24, 1930  2 Sheets-Sheet 1
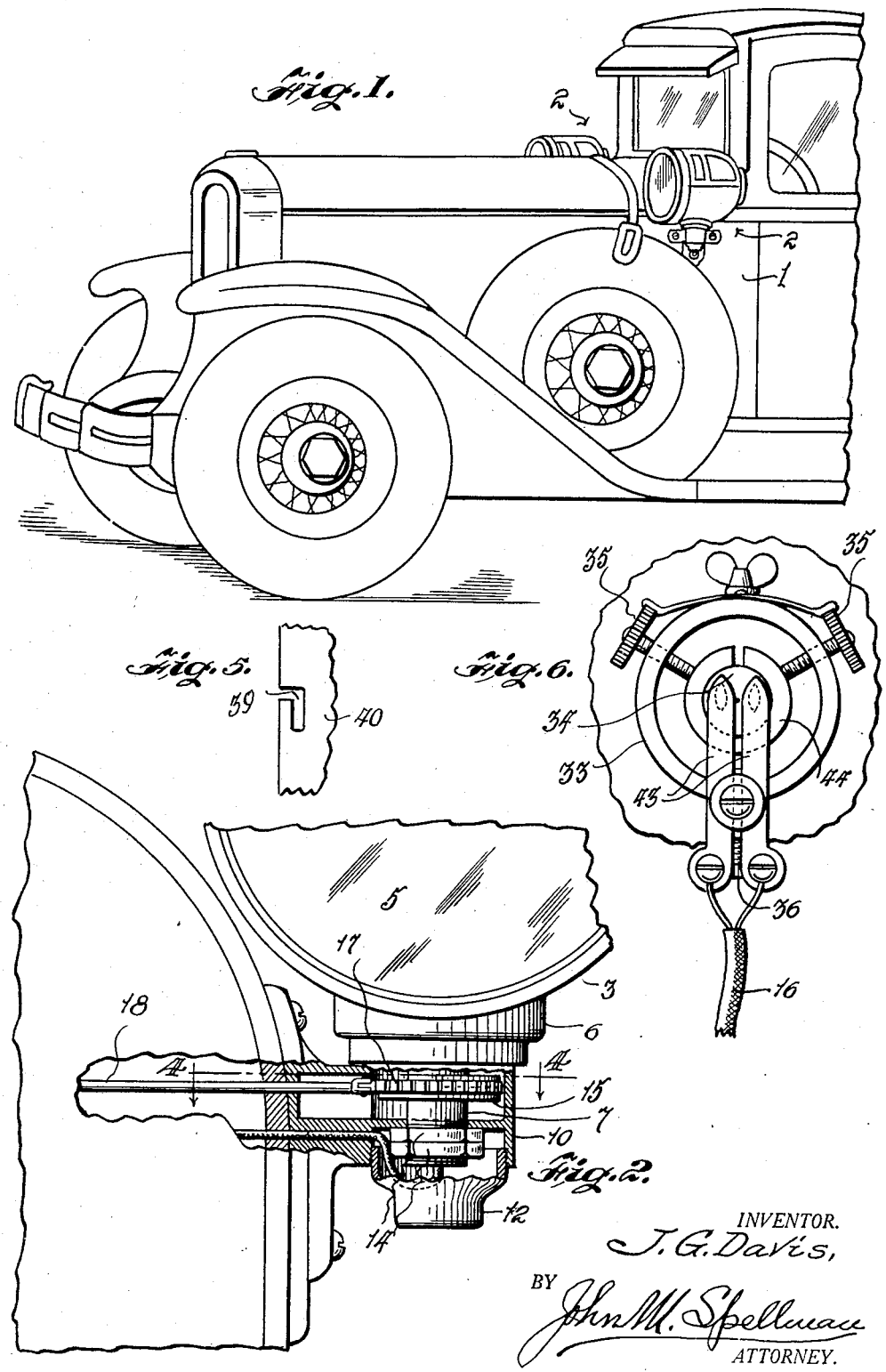
INVENTOR.
J. G. Davis,
BY John M. Spellman
ATTORNEY.

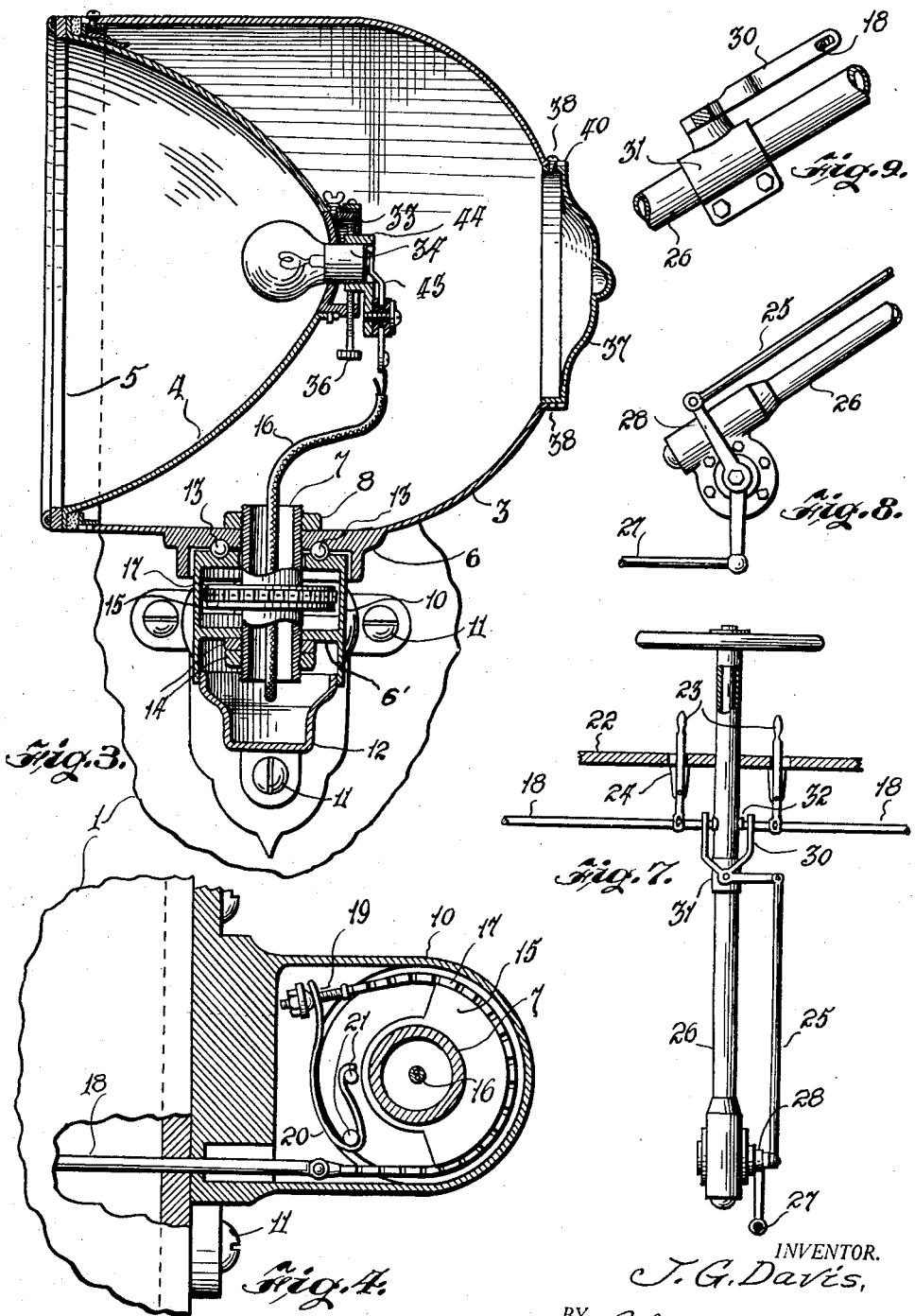

Patented July 7, 1931

1,812,935

UNITED STATES PATENT OFFICE

JOSEPH G. DAVIS, OF ARLINGTON, TEXAS

MOTOR VEHICLE HEAD LAMP

Application filed April 24, 1930. Serial No. 447,048.

My invention relates to improvements in motor vehicle head lamps.

The primary object of my invention is to provide a head lamp of this character adapted to be rotated horizontally through the arc of a circle for the purpose of directing the light rays from the lamps in the direction in which the vehicle may be turning, each lamp rotating independently of the other lamp.

Another and important object of my invention resides in the novel means for rotating the lamps when used as a spotlight, both together or separately.

A further feature of my invention is the provision of a new and unique reflector for the lamps, so that the light generated by the electric lamps will be projected, horizontally, downwardly and laterally in correct proportion to the requirements of good road lighting, and including means for shifting the lamp globes vertically.

With the above and further objects in view, my invention will be better understood from a perusal of the following detailed description, taken in connection with the accompanying drawings, and wherein:

Figure 1 represents in perspective the front portion of a motor vehicle and illustrating the position of the new and improved head lamps thereon.

Figure 2 is an enlarged, sectional detail view of the means for attaching one of the lamps to the vehicle and for supporting the lamp in a rotatable position, the vehicle and lamp being broken away.

Figure 3 is an enlarged vertical sectional view through one of the lamps and the supporting means.

Figure 4 is an enlarged detail sectional view of the rotating and supporting means, the view being taken along the line 4—4 of Figure 2.

Figure 5 is a fragmentary view of an element for forming a bayonet-joint connection in certain parts of the invention.

Figure 6 is an enlarged detail view of the rear portion of the means for supporting and adjusting the lamp globes.

Figure 7 is a side elevational view of a steering post and cowl dash of an automobile and illustrating the means for connecting the lamps to the steering mechanism.

Figure 8 is a detail sectional view of the lower end of the steering post, steering rod as shown in Figure 7, and Figure 9 is another detail view, enlarged, of the steering post, the view being intermediate the ends of said post.

Referring more closely to the drawings, the several parts thereof being indicated numerically, 1 denotes the side of a motor vehicle and on which the lamps, indicated generally at 2, are attached. Each lamp has a housing 3, carrying the reflector 4, and lens 5. The housing includes a base plate 6 with a threaded hollow post 7, preferably secured to the base plate by a nut 8. Secured to each side of the vehicle is a bracket with an integrally formed housing 10, the latter attached to the vehicle by the screws 11. The lower end of the housing 10 is threaded for the engagement and connection therewith of a removable cap 12 for convenience of assembly and for gaining access to the lower end of the lamp parts. Interposed between the base plate 6 and the upper part of the housing 10 are ball bearings 13 having a suitable race and to enable the lamps to be the more easily rotated. The housing 10 also includes a support 6' intermediate its ends for supporting in proper vertical alinement the post 7, the lower end of this post having threadedly engaged therewith the nuts 14 whereby the post is permitted to rotate. Between the uppermost nut 14 and the support 6' is sufficient space to prevent binding of the nut with the support and to allow the post to rotate without interference of the latter. For this purpose there is mounted on each post 7 a gear 15. The post also provides a passageway for the wires 16 for supplying electric current to the lamps.

In Figure 4 the gear 15 is more clearly shown and in association therewith is a sprocket chain 17, connected to a rod 18, one end of the spring at 19 being connected with a spring 20. This spring is mounted on the gear and passed around the pins 21, and serves to maintain the chain in a taut and properly stretched position.

Referring to Figure 7, each of the rods 18 are directed through the bracket 9 on each side of the vehicle and pass under the cowl dash 22. The inner ends of each of these rods as will be clear from Figure 7 are attached to a small vertically-disposed lever 23, the levers passing through the cowl dash and supported thereto by the members 24. The arrangement is such that when the levers are moved laterally the rod or rods 18 will be slid horizontally, and through the chain will rotate the lamps, when the lamps are utilized as a spot light. It will be apparent that both lamps may be thus moved either singly or together.

The lamps are also arranged so as to be rotated when the vehicle is making a turn or curve, by means of the steering parts. This arrangement is carried out by connecting a lever 25 to the steering post 26, the steering rod 27 being also shown for the sake of clearness. This lever 25 is connected to the post by a small link 28, as more clearly shown in Figure 8, and to the upper end of lever 25 is connected a yoke 30. The yoke is pivoted to the steering post by the cuff 31. Then each of the rods 18 are passed through a slot in each prong of the yoke as shown in Figure 9. Each end of the rods 18 have small knobs 32 to prevent them from passing beyond the slots.

Means are also provided for moving the globes vertically for adjusting the light rays and in Figure 6 and 3 are shown the manner of accomplishing this feature. The rear of the reflector 4 includes a support 33 in which is centrally held the base of the globe 34. These globes are normally held in position by the three screws 35—35 and 36. When necessary to move the globes downwardly, the screw 36 is loosened and the screws 35 advanced, and the globes may be raised by reversing the operation to effect an upward adjustment of the globes, thus permitting the globes to be raised or lowered.

From the foregoing it will be apparent that the lamps are capable of being rotated as the vehicle turns or makes a curve, and when thus operated, say in making a left turn, the lamp on the right will remain stationary, and the lamp on the left will rotate as the steering wheel is turned to rotate the steering apparatus, and through the rod 25 will pull the knob 32 and rotate the lamp on the left. A similar arrangement operates the right hand lamp in making a right turn.

Each lamp can be rotated independently or both together when used as a spot light, by lateral movement of the small levers 23, as will be apparent from Figure 7.

Attention is called to the position of the lamps adjacent the cowl of the vehicle and whereby the lamps are thus disposed in a position higher than those commonly used, and approximating the center between the front and rear of the vehicle. I hold this to be an important feature of my invention, as the lamps will thus operate as an efficient non-glare road lamp when so placed. This removes the lamps from a danger zone of injury and displacement to one of comparative safety and also where it is better protected from dirt and splash of vehicles. The source of light being higher, it gives a truer value of the light and shade effect of the road surface. Being near the source of electrical energy it is economical and freer from electrical wire troubles. Also in the position described, it lends itself to the artistic arrangement of lines and color scheme of the car on which placed.

Attention is also called to Figure 3, wherein is shown a removable cap 37 whereby access can be had to the lamp globe and parts which is an important feature of my invention. This cap is held in position by the screws 38 in connection with the bayonet notches as depicted in Figure 5. Both the screws are arranged so as to be moved into one of these notches, the latter being formed in the rim 40 of the reflector, the screws having a threaded seat in the cap. Obviously when the screws are loosened in their seat, the cap may be rotated slightly and the cap removed. However, other well known means such as this may be used so as to make the cap removable. I claim this feature new, as ordinarily the reflector and lens must be removed to get at the lamp globes and to make adjustments.

Also the disclosure in Figure 6 shows an improved arrangement for forming a contact with the wires 16 where the base 34 of the globe carries both contact points. In this arrangement the contacts 43 are both employed to seat against the base 24. In other types of vehicles the globe carries a pin and slot arrangement in connection with a spring, a slight inner movement of the globe causing the contacts to be made. Difficulty is frequently experienced in this construction, because the spring owing to wear or other reasons prevents good contact. This is overcome by means of the contacts 43, the globe base being held tight by the screws 35 bearing upon the support 44, thus tightening the base of the globe in its seat. Where the old style of globe base is used, that is when one of the electrical contacts is had through the metallic parts of the lamp equipment to form a ground or return wire, one of these contacts 43 can be removed from the base and connection made as described.

What is claimed as new is:

1. A revoluble head lamp for motor vehicles comprising a housing carrying a reflector and a lens, a base plate on the housing having an opening, a post traversing the opening; a bracket for supporting the lamp from the sides of a vehicle, said bracket having a housing with spaced parts, said post providing a pivotal connection between the base plate and the bracket housing, a gear carried on the post, a chain associated with the gear for imparting rotation to the post to revolve the lamp; said post being channeled for an electric wire; means connected with the chain and associated with the steering mechanism of the vehicle, whereby when the vehicle is steered from a straight course said lamp will be rotated to move in the arc of a circle in the direction toward which the vehicle is traveling.

2. A revoluble head lamp for motor vehicles comprising a housing carrying a reflector and a lens; means on the reflector for supporting an electric light globe; a plate on the housing, a bracket for attaching the lamp to the side of a vehicle adjacent the cowl dash whereby the lamp (or lamps) is disposed approximately midway of the vehicle body; said bracket having an integrally-formed housing with spaced parts and a hollow post revolubly seated in the housing of the bracket, said post forming a connection between said plate and the housing of the bracket; a sprocket gear carried on said post, and a chain associated with the gear and connected with the steering mechanism of the vehicle; whereby when the vehicle is steered from a straight course one of said lamps will be rotated to follow the turn or curve of the vehicle and the other lamp will not be affected by said steering mechanism.

3. A head lamp as claimed in claim 2, said spur gear including a spring connected to one end of said chain to maintain the said chain in a taut condition on the gear; said chain being connected to one end of a rod, the other end of said rod having a loose connection with the steering rod parts of the automobile, said arrangement being such that when the steering rod is moved to direct the vehicle from a straight course, one of said lamps will be revolved and follow the arc of a circle in the direction of the turn of said vehicle.

4. A revoluble head lamp for motor vehicles, one each of said lamps being attached to the sides of the vehicle adjacent the cowl dash thereof and approximately midway of the vehicle body; a housing for the lamp parts, a bracket for attaching the lamp to the sides of the vehicle, a plate on the housing, bearings interposed between said plate and the bracket for the more easy rotation of the lamp; a post connecting the plate and the bracket, a spur gear mounted on said post, and a chain associated with the gear; said chain having connection with the steering gear of the vehicle, whereby when the vehicle makes a turn one of said lamps will be rotated to follow the course of the vehicle and be revolved in the direction said vehicle turns.

5. A revoluble head lamp for motor vehicles, one each of said lamp occupying a position approximately midway of the vehicle body and adjacent the cowl dash thereof; a housing for the lamp parts, a bracket for connecting the lamp to the sides of the vehicle; means connecting said bracket and said housing; a sprocket gear carried on said bracket and housing connection; a chain associated with said gear, and a rod connected to said chain; said rod having connection to a support on the cowl dash of the vehicle and including a lever; said lever having pivotal connection with said chain rod; the arrangement being such that one or both of said lamps can be rotated as a spotlight and independently of each other when said levers are actuated.

6. A head lamp as claimed in claim 4, said means for connecting the steering mechanism with said chain comprising a rod for each lamp, each rod being connected with a chain of each lamp; a yoke pivoted to the steering post housing of the vehicle; a rod pivoted to said yoke and having pivotal connection with the worm gear shaft of said steering post; the inner ends of said rods which are connected with said chains having a loose connection with said yoke; the arrangement being such that when the steering mechanism is rotated, said movement will cause one of said lamps to be rotated and permit the lamp to follow the arc of a circle when the vehicle makes a turn; the other lamp remaining in normal movement with the vehicle.

7. A head lamp as claimed in claim 1, said reflector housing having its rear end open and a removable cap having connection therewith, whereby access can be had to the interior of the housing for removing the globe and making adjustments; said reflector including a support for the globe whereby the base of the globe is made to contact with both wires of the circuit; said support for the globe being removable from the reflector together with the globe; the aperture thus disclosed being large enough to permit the withdrawal of the globe from the reflector rearwardly.

In testimony whereof I affix my signature.

JOSEPH G. DAVIS.